United States Patent
Takano (10) Patent No.: US 11,226,872 B2
(45) Date of Patent: Jan. 18, 2022

(54) INFORMATION PROCESSING APPARATUS, FILE MANAGEMENT APPARATUS, AND FILE MANAGEMENT SYSTEM

(71) Applicant: FUJIFILM BUSINESS INNOVATION CORP., Tokyo (JP)

(72) Inventor: Kentaro Takano, Ashigarakami-gun (JP)

(73) Assignee: FUJIFILM Business Innovation Corp., Tokyo (JP)

(\*) Notice: Subject to any disclaimer, the term of this patent is extended or adjusted under 35 U.S.C. 154(b) by 0 days.

(21) Appl. No.: 16/519,466

(22) Filed: Jul. 23, 2019

(65) Prior Publication Data

US 2020/0301792 A1 Sep. 24, 2020

(30) Foreign Application Priority Data

Mar. 18, 2019 (JP) .............................. JP2019-050023

(51) Int. Cl.
G06F 11/14 (2006.01)
G06F 16/16 (2019.01)
G06F 16/11 (2019.01)

(52) U.S. Cl.
CPC ...... *G06F 11/1469* (2013.01); *G06F 11/1435* (2013.01); *G06F 16/122* (2019.01); *G06F 16/162* (2019.01)

(58) Field of Classification Search
CPC ............ G06F 11/1471; G06F 11/1469; G06F 11/1464; G06F 11/1458; G06F 11/2048; G06F 16/162; G06F 16/122; G06F 11/1435
See application file for complete search history.

(56) References Cited

U.S. PATENT DOCUMENTS

| 8,307,251 B2* | 11/2012 | Yamada | H04L 67/00 714/748 |
| 8,825,606 B1* | 9/2014 | Zhang | G06F 21/568 707/679 |
| 9,094,425 B2* | 7/2015 | Couper | G06Q 10/107 |
| 2003/0084105 A1* | 5/2003 | Wiley | H04N 1/32122 709/205 |

(Continued)

FOREIGN PATENT DOCUMENTS

JP 2005-173724 A 6/2005

OTHER PUBLICATIONS

Jun. 6, 2020 Office Action issued in Australian Patent Application No. 2019208258.

*Primary Examiner* — Idriss N Alrobaye
*Assistant Examiner* — Richard B Franklin
(74) *Attorney, Agent, or Firm* — Oliff PLC (57) ABSTRACT

An information processing apparatus, includes a query unit that requests a query for a file to a device in a transmission destination or a transmission source based on a transmission or reception history of the file, in response to a restoration instruction to restore the file from a terminal device, the restoration instruction being made after a deletion instruction to delete the file is made at the terminal device; and a file restoration unit that restores the file by acquiring the file from the device storing the file in a case where the file is found to be present in the device in the transmission destination or the transmission source as a result of the query.

4 Claims, 13 Drawing Sheets

(56) References Cited

U.S. PATENT DOCUMENTS

2007/0234115 A1 10/2007 Saika
2013/0110790 A1 5/2013 Matsumoto et al.
2013/0151924 A1 6/2013 Beadle et al.

* cited by examiner

| FILE ID | TRANSMITTER | DATE AND TIME OF TRANSMISSION | RECEIVER | DATE AND TIME OF RECEPTION | OPERATION HISTORY | DATE AND TIME OF OPERATION | META INFORMATION CREATOR OR THE LIKE |
|---|---|---|---|---|---|---|---|
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |

INFORMATION PROCESSING APPARATUS, FILE MANAGEMENT APPARATUS, AND FILE MANAGEMENT SYSTEM

CROSS-REFERENCE TO RELATED APPLICATIONS

This application is based on and claims priority under 35 USC 119 from Japanese Patent Application No. 2019-050023 filed on Mar. 18, 2019.

BACKGROUND

Technical Field

The present invention relates to an information processing apparatus, a file management apparatus, and a file management system.

Related Art

JP-A-2005-173724 discloses a documentary management system that is configured with at least one file server that assigns an attribute to a file which is shared on a network, and at least one client terminal that is capable of accessing the file through the network, the documentary management system, in which the file server includes an original duplication determination unit that determines new registration of, or duplication registration of, a file, based on an attribute of a file uploaded from the client terminal; an original registration unit that assigns an attribute including an identifier of the file server to an original file uploaded, in a case where a determination as the new registration is made in the original duplication determination unit; a duplicate document retention notification unit that notifies a file server corresponding to a server identifier, which retains an original acquired from attribute information on a duplication file, of identification information on a server with which a duplicate document is registered, in a case where it is determined in the original duplication determination unit that a file is a duplicate; and a duplicate document retention server management unit that stores and manages the server identifier that is notified by the duplicate document retention notification unit.

SUMMARY

Aspect of non-limiting embodiments of the present disclosure relates to provide an information processing apparatus, a file management apparatus, and a file management system that are capable of easily restoring a file in a case where the file is deleted comparing with a case where a transmission destination of the file is searched and the file is sent back from the transmission destination found. At this point, the file means one piece of data or a program, and is exemplified as a document, data such as a moving image, or a program for executing a computer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a query unit that requests a query for a file to a device in a transmission destination or a transmission source based on a transmission or reception history of the file, in response to a restoration instruction to restore the file from a terminal device, the restoration instruction being made after a deletion instruction to delete the file is made at the terminal device; and a file restoration unit that restores the file by acquiring the file from the device storing the file in a case where the file is found to be present in the device in the transmission destination or the transmission source as a result of the query.

BRIEF DESCRIPTION OF DRAWINGS

Exemplary embodiment(s) of the present invention will be described in detail based on the following figures, wherein.

DETAILED DESCRIPTION

Figure 1:
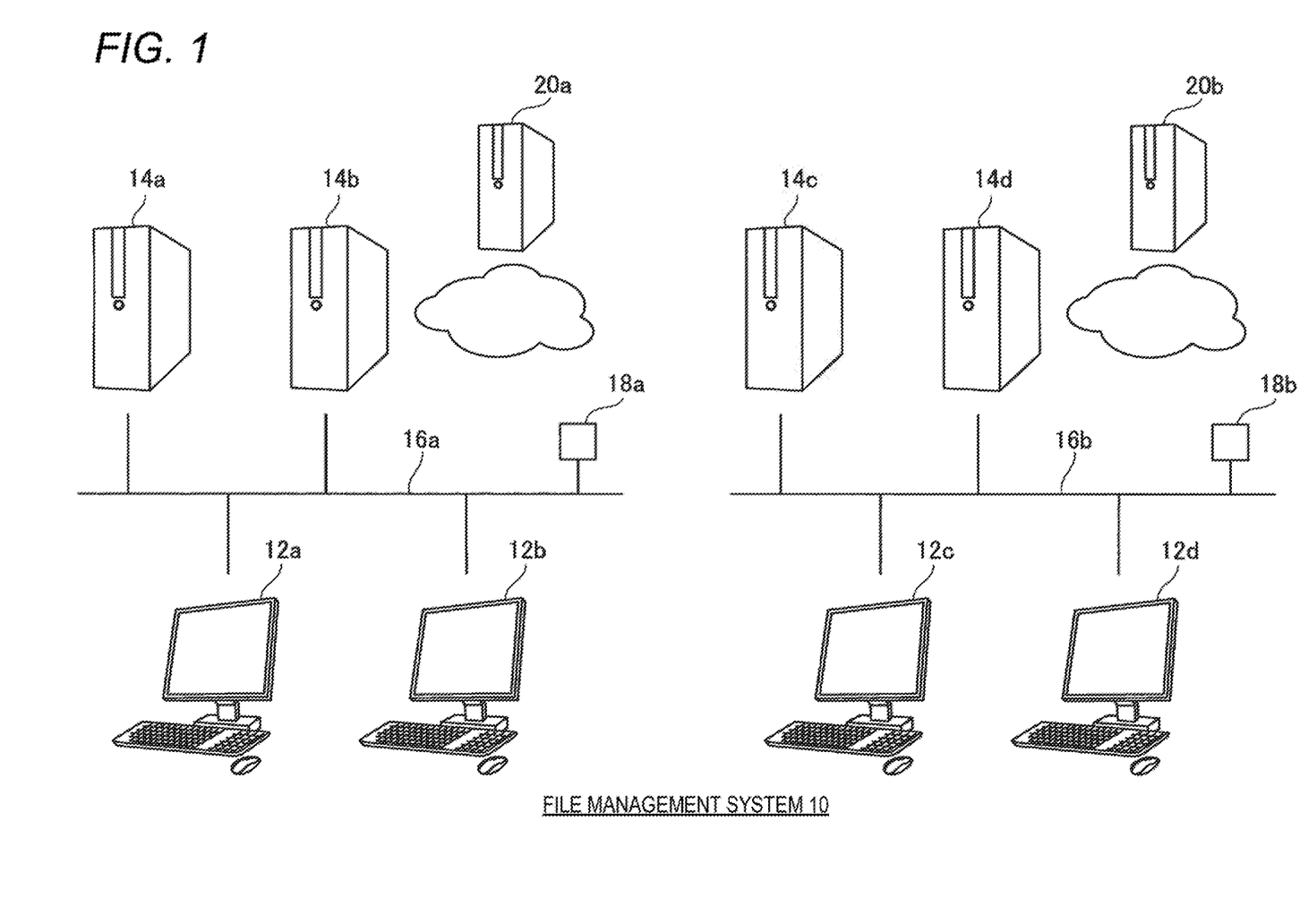
FIG. 1 is a configuration diagram illustrating a file management system according to an exemplary embodiment according to the present invention.

Next, an exemplary embodiment of the present invention will be described in detail with reference to the drawings. A file management system 10 according to the exemplary embodiment according to the present invention is illustrated in FIG. 1.

The file management system 10 includes multiple networks. For example, there are two networks. Terminal devices 12*a* and 12*b* and terminal devices 12*c* and 12*d*, and servers 14*a* and 14*b* and the servers 14*c* and 14*d* are connected to each other through networks 16*a* and 16*b*, respectively. The terminal devices 12a to 12d, for example, are personal computers or mobile terminals. The networks 16a and 16b may local area networks and may be the Internet. Servers in one pair, the server 14a and the server 14c, are shared between the terminal devices 12a and 12b and between the terminal devices 12c and 12d, respectively. Servers in the other pair, the server 14b and 14d, manages the access rights of users of the terminal devices 12a, 12b, 12c, and 12d, may specify a user who uses the access right, and are hereinafter referred to as device management servers. Furthermore, the networks 16a and 16b are connected to the Internet through routers 18a and 18b, respectively, and in addition, are connected to servers 20a and 20b, respectively. The servers 20a and 20b manage a home server 14a and are hereinafter referred to upper servers.

Figure 2:
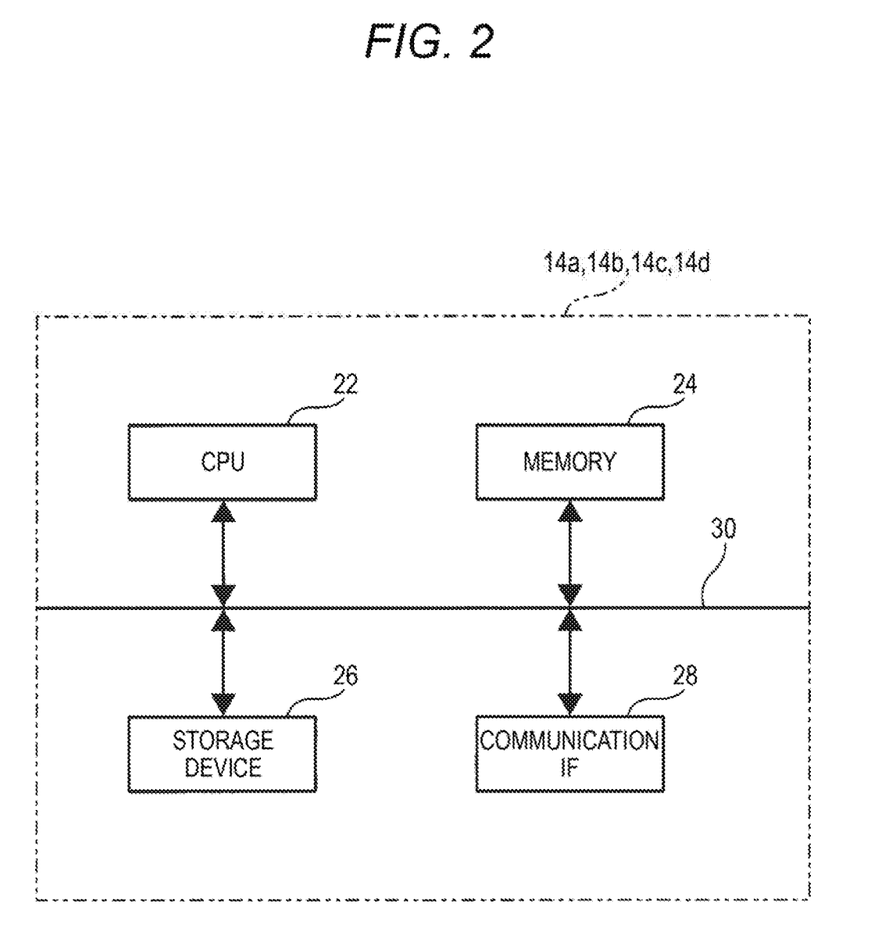
FIG. 2 is a block diagram illustrating a home server that is used for the exemplary embodiment according to the present invention.

FIG. 2 is a block diagram illustrating pieces of hardware, home servers 14a and 14c. Each of the home servers 14a and 14c each has a CPU 22, a memory 24, a storage device 26, and a communication interface 28. The CPU 22, the memory 24, the storage device 26, and the communication interface 28 are connected to each other through a bus 30.

The CPU 22 performs processing that is determined in advance, based on a control program that is stored in the memory 24. The storage device 26, for example, is configured with a hard disk. Software or data is stored in the storage device 26. Data is input to and output from the communication interface 28 over the above-described networks 16a and 16b.

Figure 3:
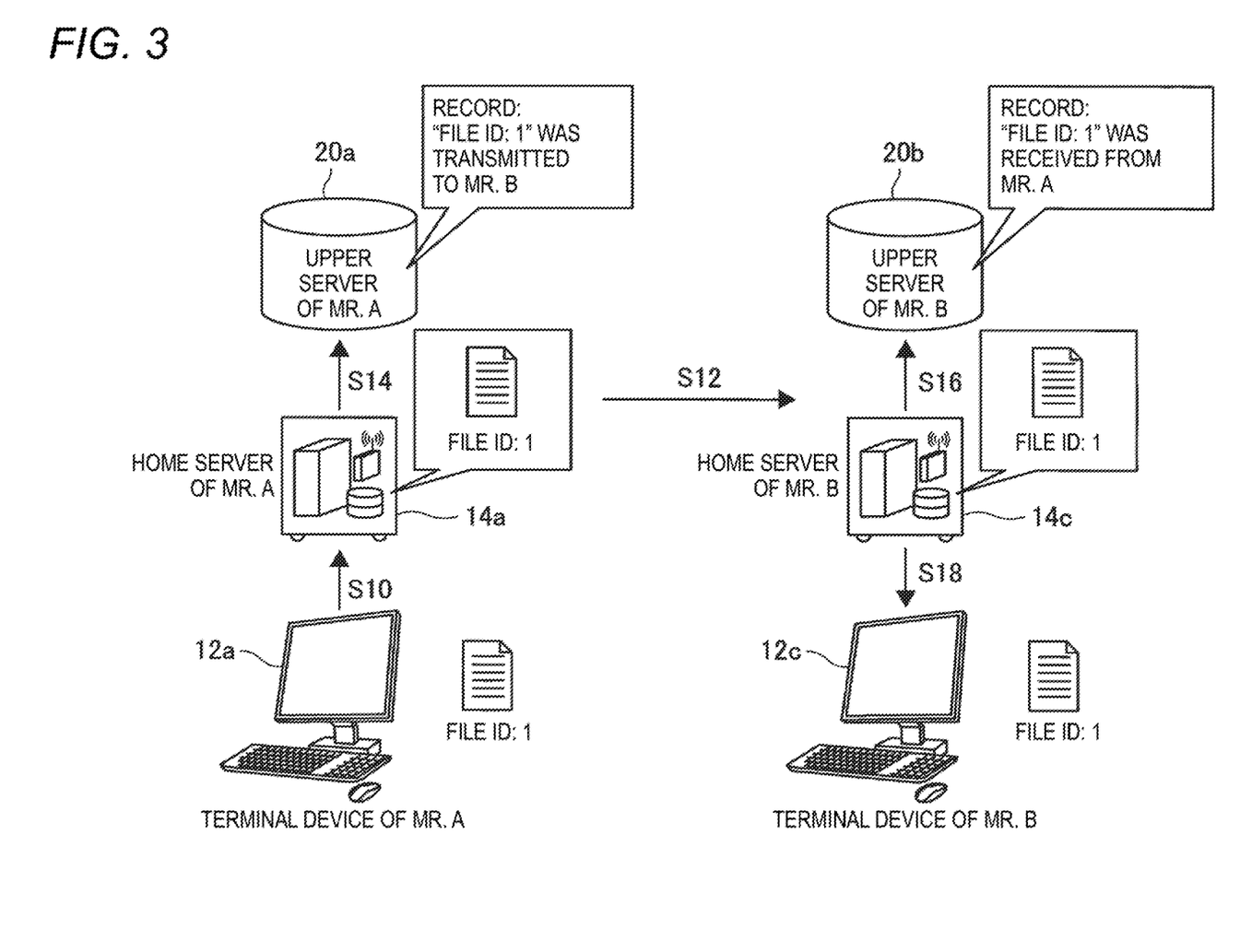
FIG. 3 is a descriptive diagram illustrating reception of a file in the exemplary embodiment according to the present invention.

FIG. 3 is a descriptive diagram illustrating an outline in a case where a file is transmitted and received. At this point, when a terminal device of Mr. A and a terminal device of Mr. B are defined as the terminal device 12a and the terminal device 12c, respectively, a home server of Mr. A and a home server of Mr. B are defined as the home server 14a and the home server 14c, and an upper server of Mr. A and an upper server of Mr. B are defined as the upper server 20a and the upper server 20b, respectively.

First, in Step S10, Mr. A instructs the terminal device 12a of Mr. A to send a file with "file ID: 1" to Mr. B. In the next step that is Step S12, the file with "file ID: 1" that is stored in the storage device 26 of the home server 14a of Mr. A is sent to the home server 14c of Mr. B. In Step S14, the home server 14a notified the upper server 20a that "file ID: 1" is transmitted, and a record remains that the file with "file ID: 1" is sent to Mr. B. On the other hand, in Step S6, the home server 14c notifies the upper server 20b that "file ID: 1" is received, and a record remains that the file with "file ID: 1" is received from Mr. A. Moreover, in Step S18, the file with "file ID: 1" arrives at the terminal device 12c of Mr. B. In this case, the file with "file ID: 1" is stored in a distributed manner in the terminal device 12a of Mr. A or the home server 14a of Mr. A, and the terminal device 12c of Mr. B or the home server 14c of Mr. B.

It is noted that a file ID that is peculiar to a file is given to each of all files. As the file ID, in a case where a file is created, for example, an ID that is obtained by a hash function is given. Not only in a case where a file is created, but also in a case where a file is updated, an ID is given to the updated file as another file.

Figure 4:
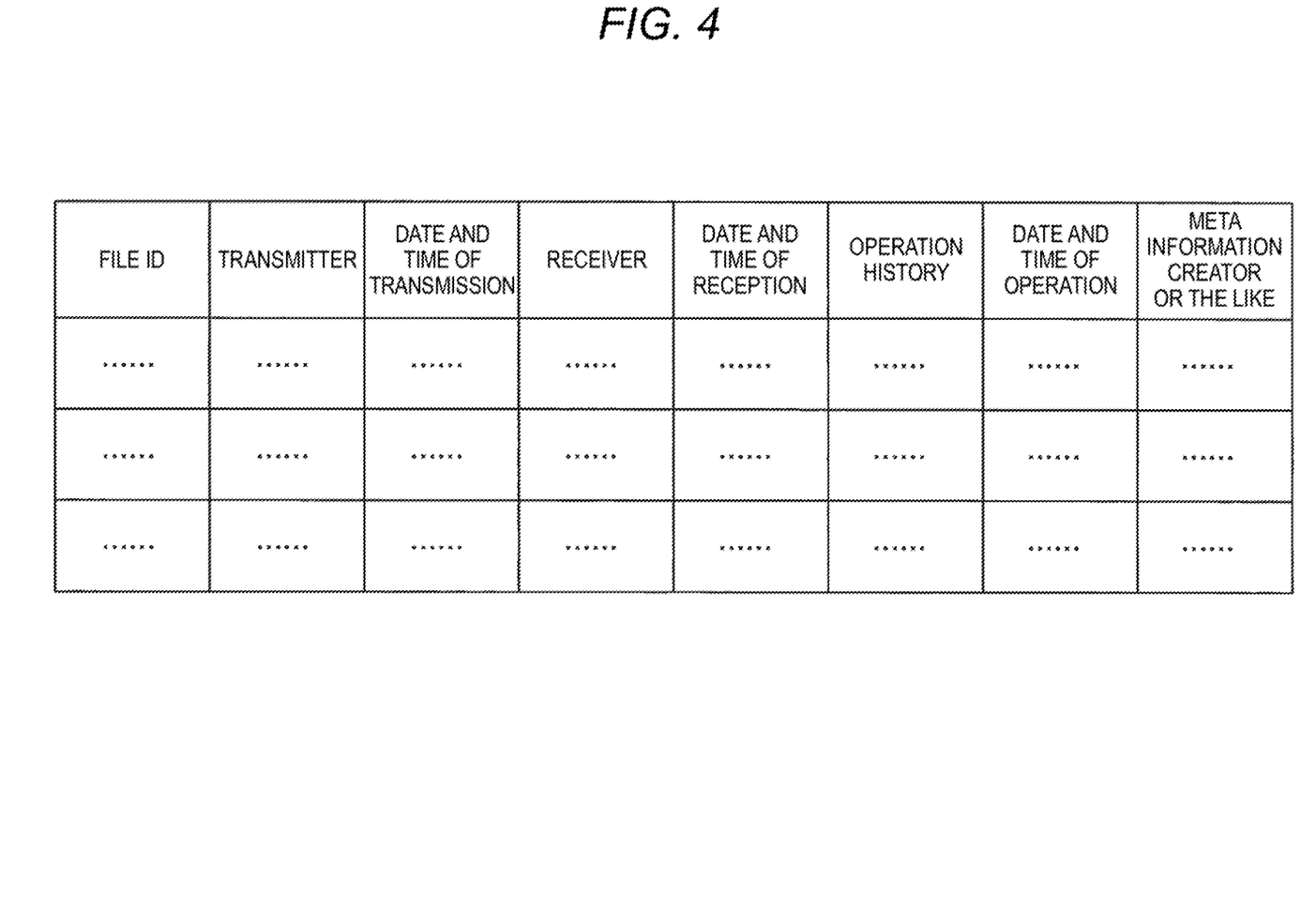
FIG. 4 is a diagram illustrating history information on a file that is recorded in an upper server.

Furthermore, for example, a history that is illustrated in FIG. 4 is recorded in the upper servers 20a and 20b. That is, for every file ID, in addition to a sender (which is recorded as an user ID of the sender), a date and time of transmission, a receiver (which is recorded as a user ID of the receiver), a data and time of reception, an operation history (deletion, reading, copying, or the like), and a date and time of operation, a creator, a date and time of creation, or the like is recorded as meta information (which is recorded as bibliographic information).

Next, dealing with a case where a file is deleted will be described.

Figure 5:
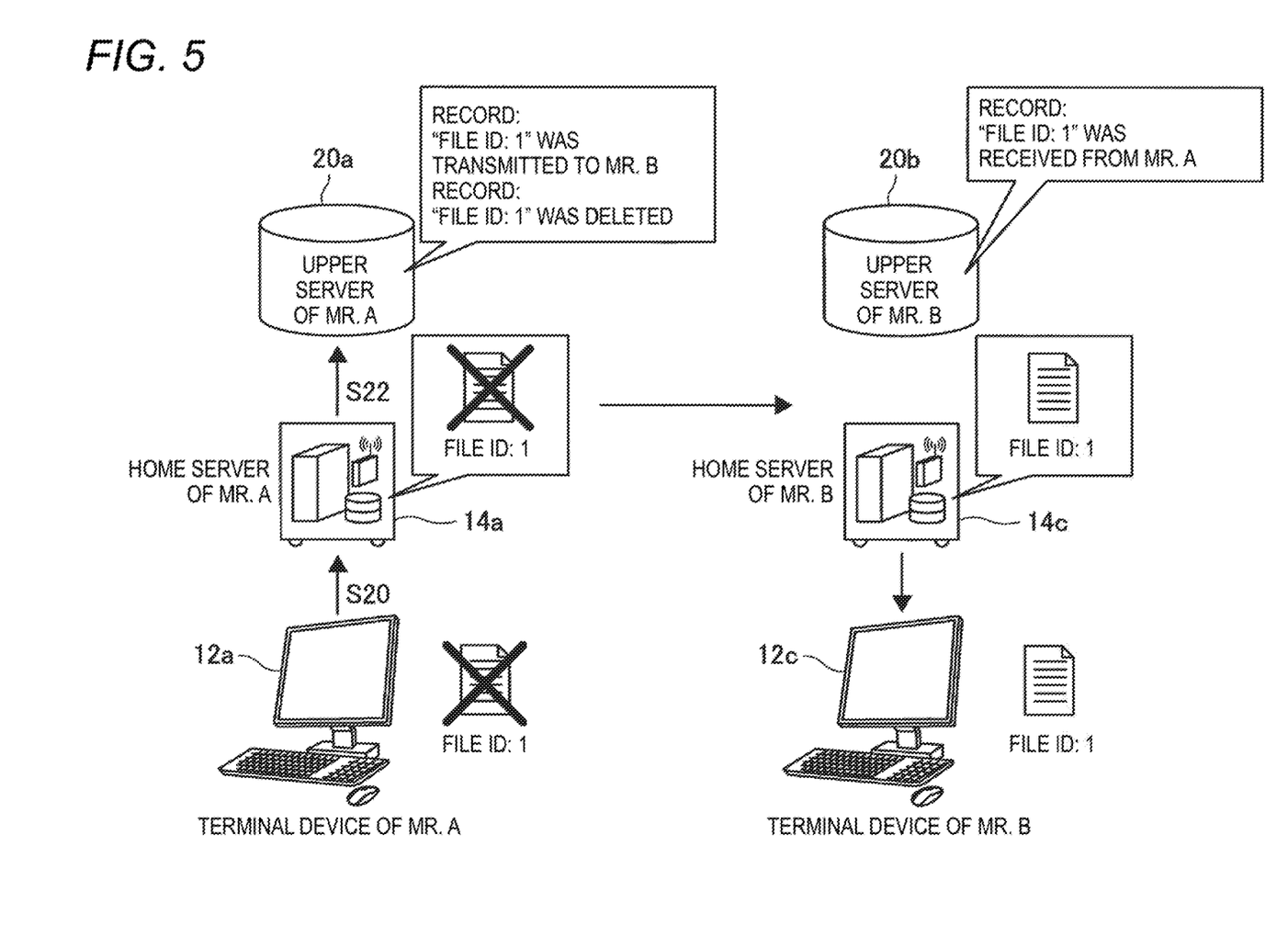
FIG. 5 is a descriptive diagram for describing Case 1 where a file is restored, in the exemplary embodiment according to the present invention.

First, as illustrated in FIG. 5, in Step S20, for example, in a case where a storage capacity of a file becomes low, and so on, when Mr. A operates the terminal device 12a of Mr. A and thus provides an instruction to delete the file with "file ID: 1" that is stored in the home server 14a of Mr. A, the file with "file ID: 1" that is stored in the home server 14a is deleted.

In this manner, although the file with "file ID: 1" is deleted from the server 14a, a record that the file with "file ID: 1" is sent to Mr. B remains in the upper server 20a of Mr. A, and the file with "file ID: 1" continues to be present in the home server 14c of Mr. B.

In the next that is Step S22, the home server 14a of Mr. A notifies the high-lever server 20a of Mr. A that "file ID: 1" is deleted. The upper server 20a of Mr. A records the fact that the file "File ID: 1" is deleted from the home server 14a of Mr. A. Information that is deleted from the home server 14a of Mr. A, along with information that "file ID: 1" is sent to Mr. B, is stored in the upper server 20a of Mr. A.

(Case 1)

As Case 1, an example of a case where Mr. A deletes the file with "file ID: 1" is illustrated in FIGS. 6 and 7.

Figure 6:
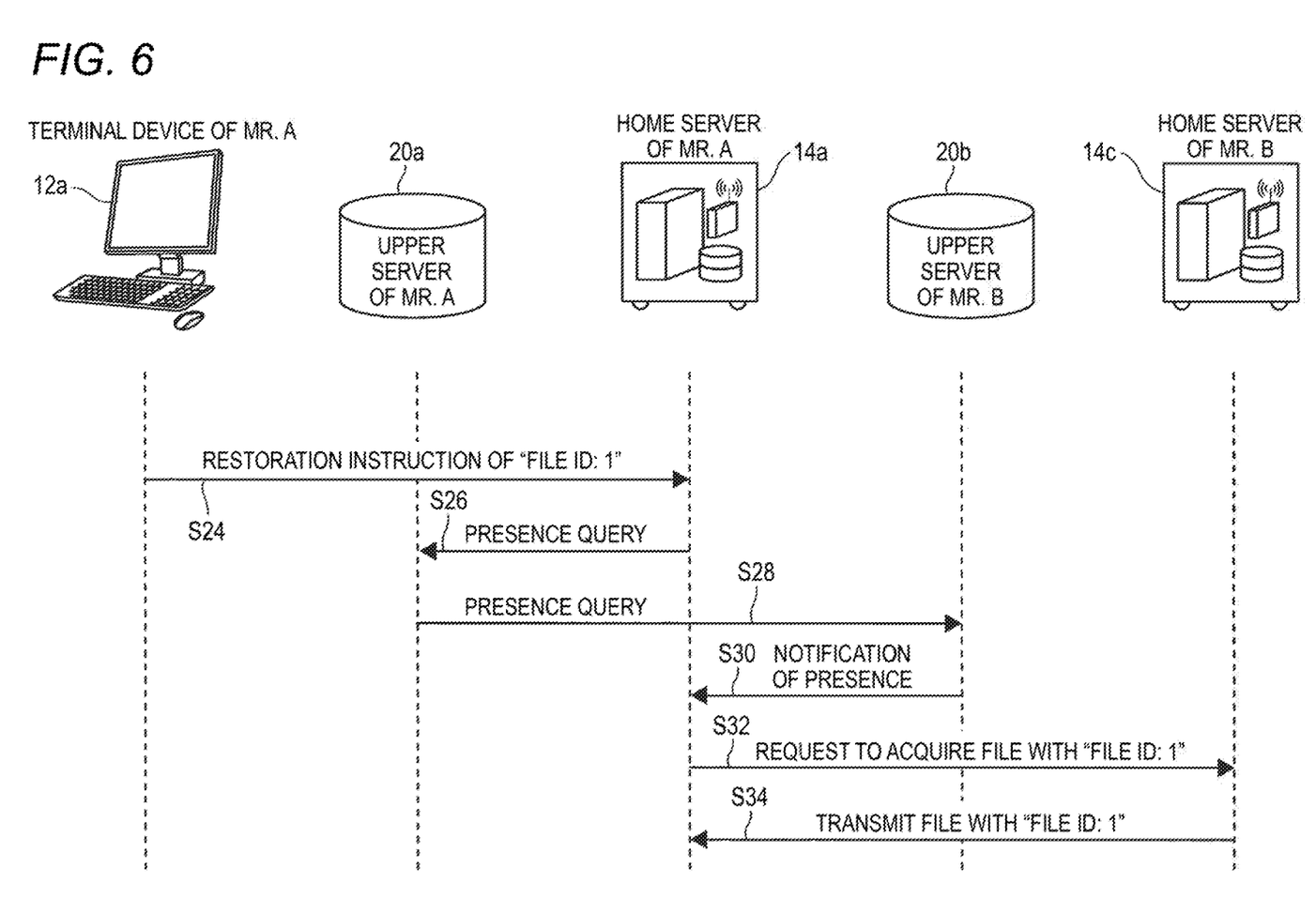
FIG. 6 is a sequence diagram illustrating a flow of information in Case 1 where the file is restored, in the exemplary embodiment according to the present invention.

As illustrated in FIG. 6, in a case where Mr. A restores the file with "file ID: 1", in Step S24, the terminal device 12a of Mr. A instructs the home server 14a of Mr. A to restore the file with "file ID: 1". In Step S26, the home server 14a of Mr. A, when instructed to restore the file with "file ID: 1", inquires the upper server 20a of Mr. A whether or not the file with "file ID: 1" is present. Because the record that the file with "file ID: 1" is transmitted to Mr. B is present in the upper server 20a, in Step S28, the upper server 20a of Mr. A, when inquired whether or not the file with "file ID: 1" is present, inquires the upper server 20b of Mr. B whether or not the file with "file ID: 1" is present. In the next that is Step S30, the upper server 20b of Mr. B notifies the home server 14a of Mr. A that the file with "file ID: 1" is present. In Step S32, the home server 14a of Mr. A, when notified of the presence of the file with "file ID: 1", makes a request to the home server 14c of Mr. B for acquisition of the file with "file ID: 1". Because the file with "file ID: 1" is present in the home server 14c of Mr. B, in Fig. S34, the home server 14c of Mr. B, when receiving the request for the acquisition of the file with "file ID: 1", transmits the file with "file ID: 1" to the home server 14a of Mr. A, and the home server 14a of Mr. A acquires the file with "file ID: 1".

Figure 7:
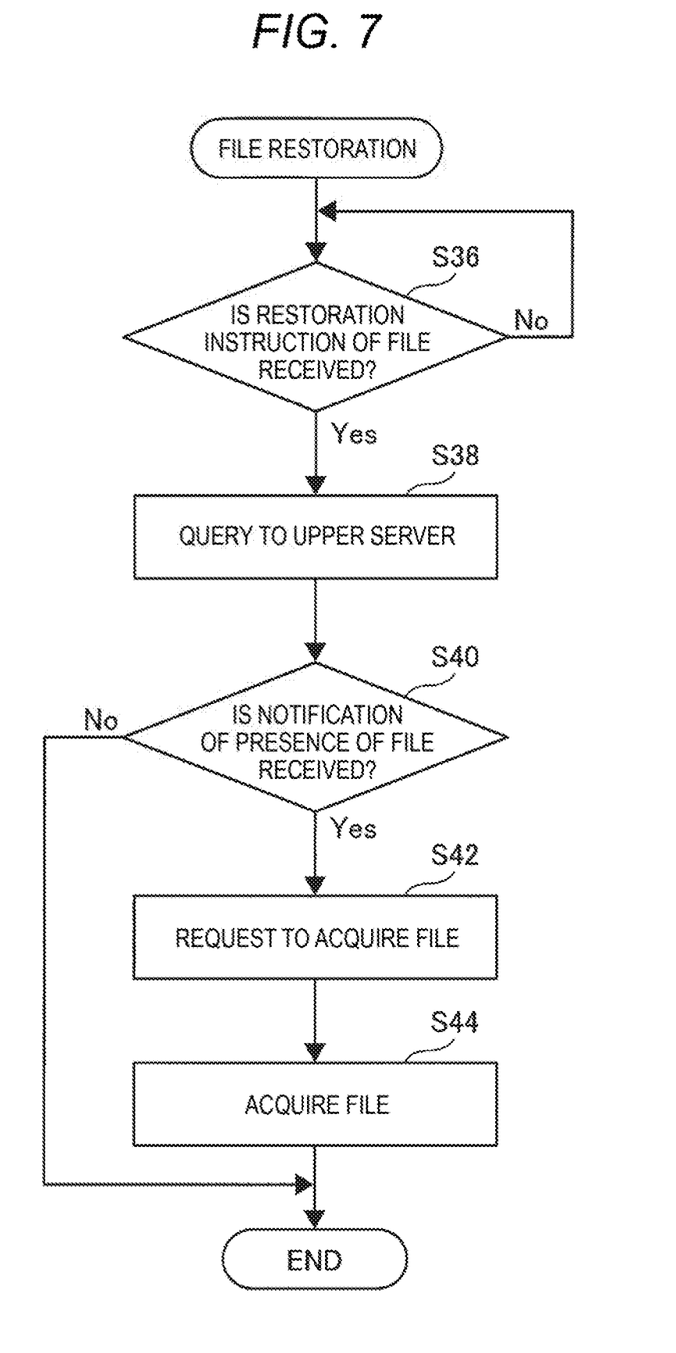
FIG. 7 is a flowchart illustrating a control flow for a home server in Case 1 where the file is restored, in the exemplary embodiment according to the present invention.

As illustrated in FIG. 7, in Step S36, the home server 14a of Mr. A determines whether or not it is instructed to restore a file. The home server 14a of Mr. A waits until instructed to restore the file, when not instructed to restore the file, and proceeds to the next step that is Step S38, when instructed to restore the file.

In Step S38, the upper server 20a is inquired, for example, whether or not the file with "file ID: 1" is present. In the next step that is Step S40, it is determined whether or not notification of the presence of the file is received. Waiting is continued until when the notification of the presence of the file is received, in a case where the notification of the presence of the file is not received, and the processing is ended in a case where the notification of the presence of the file is received. In Step S38, in a case where it is determined that the notification of the presence of the file is received, proceeding to the next step that is Step S42 takes place.

In Step S42, a request for the acquisition of the file with "file ID: 1" is made to a home server, the home server 14c of Mr. B in this case, which is notified that the file is present.

In the next step that is Step S44, the file with "file ID: 1" is acquired and the processing is ended.

(Case 2)

Figure 8:
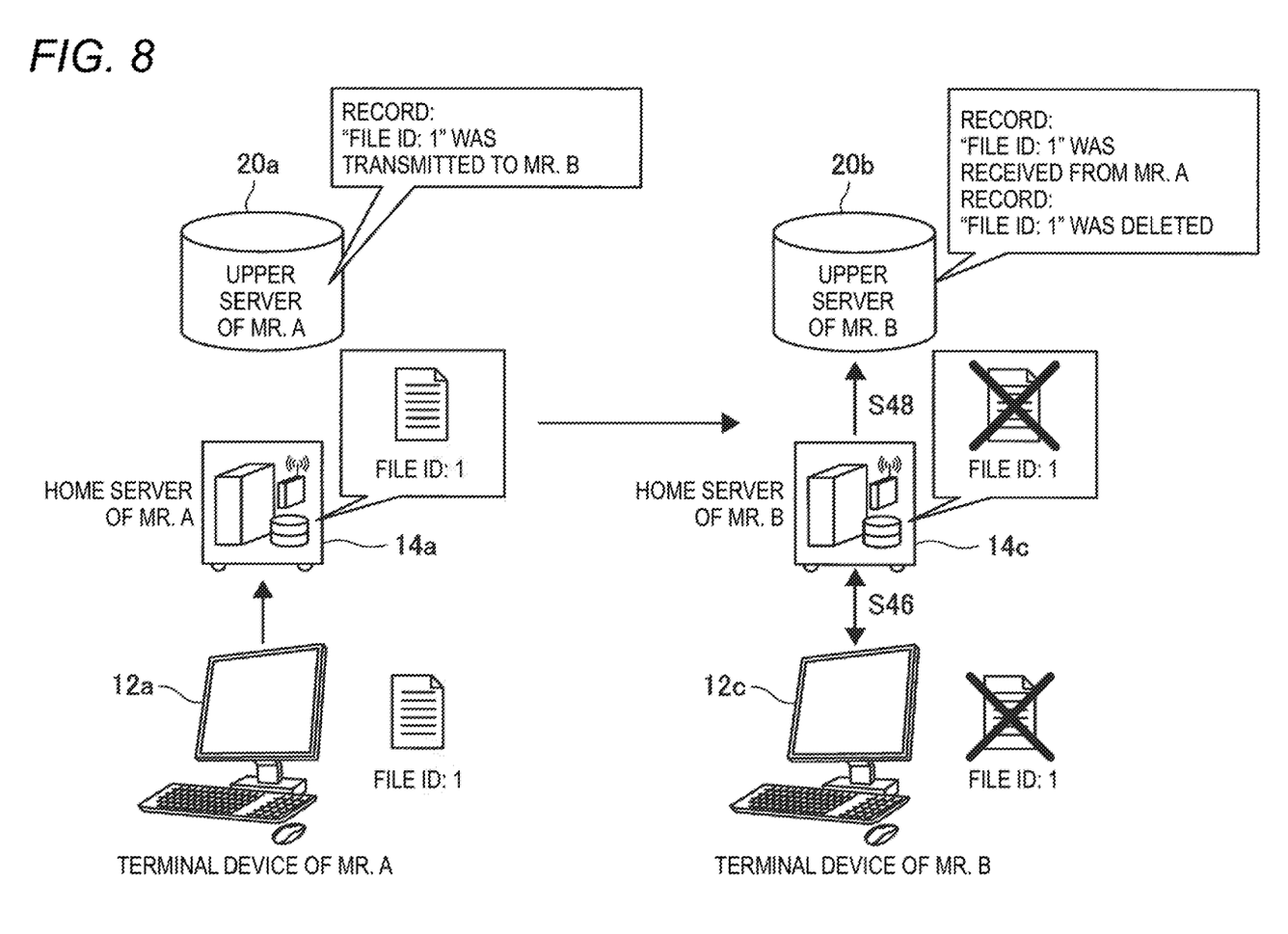
FIG. 8 is a descriptive diagram for describing a flow of information in Case 2 where the file is restored, in the exemplary embodiment according to the present invention.
Figure 9:
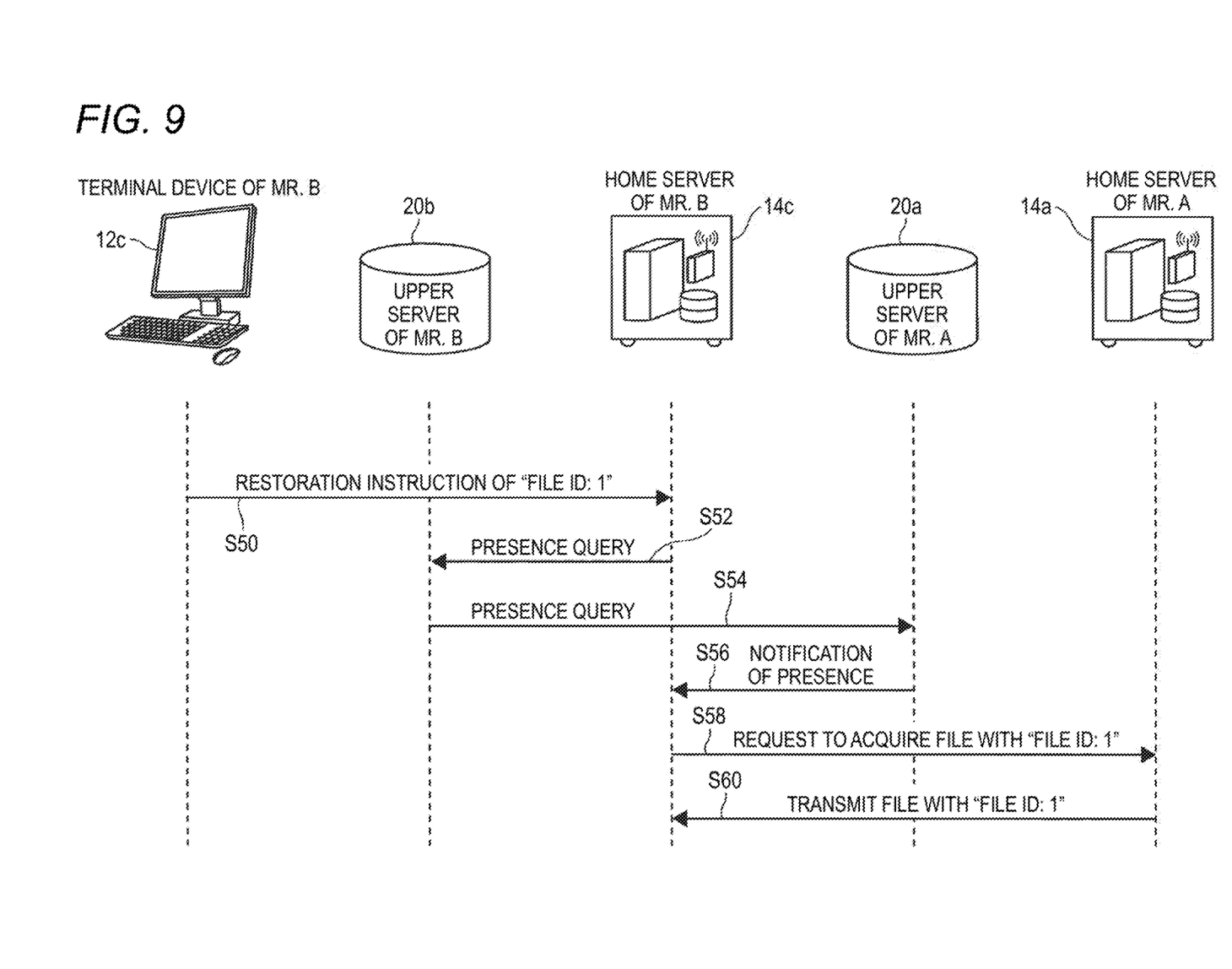
FIG. 9 is a sequence diagram illustrating the flow of information in Case 2 where the file is restored, in the exemplary embodiment according to the present invention.

In FIGS. 8 and 9, as Case 2, a case where Mr. B deletes the file with "file ID: 1" is illustrated.

First, as illustrated in FIG. 8, in Step S46, when Mr. B operates the terminal device 12c of Mr. B and thus provides an instruction to delete the file with "file ID: 1" that is stored in the home server 14c of Mr. B, the file with "file ID: 1" that is stored in the home server 14c is deleted.

In this manner, although the file with "file ID: 1" is deleted from the home server 14c, a record that the file with "file ID: 1" is received from Mr. A remains in the upper server 20b of Mr. B, and in addition, the file with "file ID: 1" continues to be present in the home server 14a of Mr. A.

In the next step that is Step S48, the upper server 20b is notified that "file ID: 1" is deleted from the home server 14c of Mr. B. The upper server 20b of Mr. B records the fact that the file with "file ID: 1" is deleted from the home server 14c of Mr. B. Information that is deleted from the home server 14c of Mr. B, along with information that "file ID: 1" is received from Mr. A, is stored in the upper server 20b of Mr. B.

Next, as illustrated in FIG. 9, in a case where Mr. B restores the file with "file ID: 1", in Step S50, the terminal device 12c of Mr. B instructs the home server 14c of Mr. B to restore the file with "file ID: 1". In Step S52, the home server 14c of Mr. B, when instructed to restore the file with "file ID: 1", inquires the upper server 20b of Mr. B whether or not the file with "file ID: 1" is present. Because the record that the file with "file ID: 1" is received from Mr. A is present in the upper server 20a, in Step S54, the upper server 20b of Mr. B, when inquired whether or not the file with "file ID: 1" is present, inquires the upper server 20a of Mr. A whether or not the file with "file ID: 1" is present. In the next that is Step S56, the upper server 20a of Mr. A notifies the home server 14c of Mr. B that the file with "file ID: 1" is present. In Step S58, the home server 14c of Mr. B, when notified of the presence of the file with "file ID: 1", makes a request to the home server 14a of Mr. A for the acquisition of the file with "file ID: 1". Because the file with "file ID: 1" is present in the home server 14a of Mr. A, in Fig. S60, the home server 14a of Mr. A, when receiving the request for the acquisition of the file with "file ID: 1", transmits the file with "file ID: 1" to the home server 14c of Mr. B, and the home server 14c of Mr. B acquires the file with "file ID: 1".

(Case 3)

Figure 10:
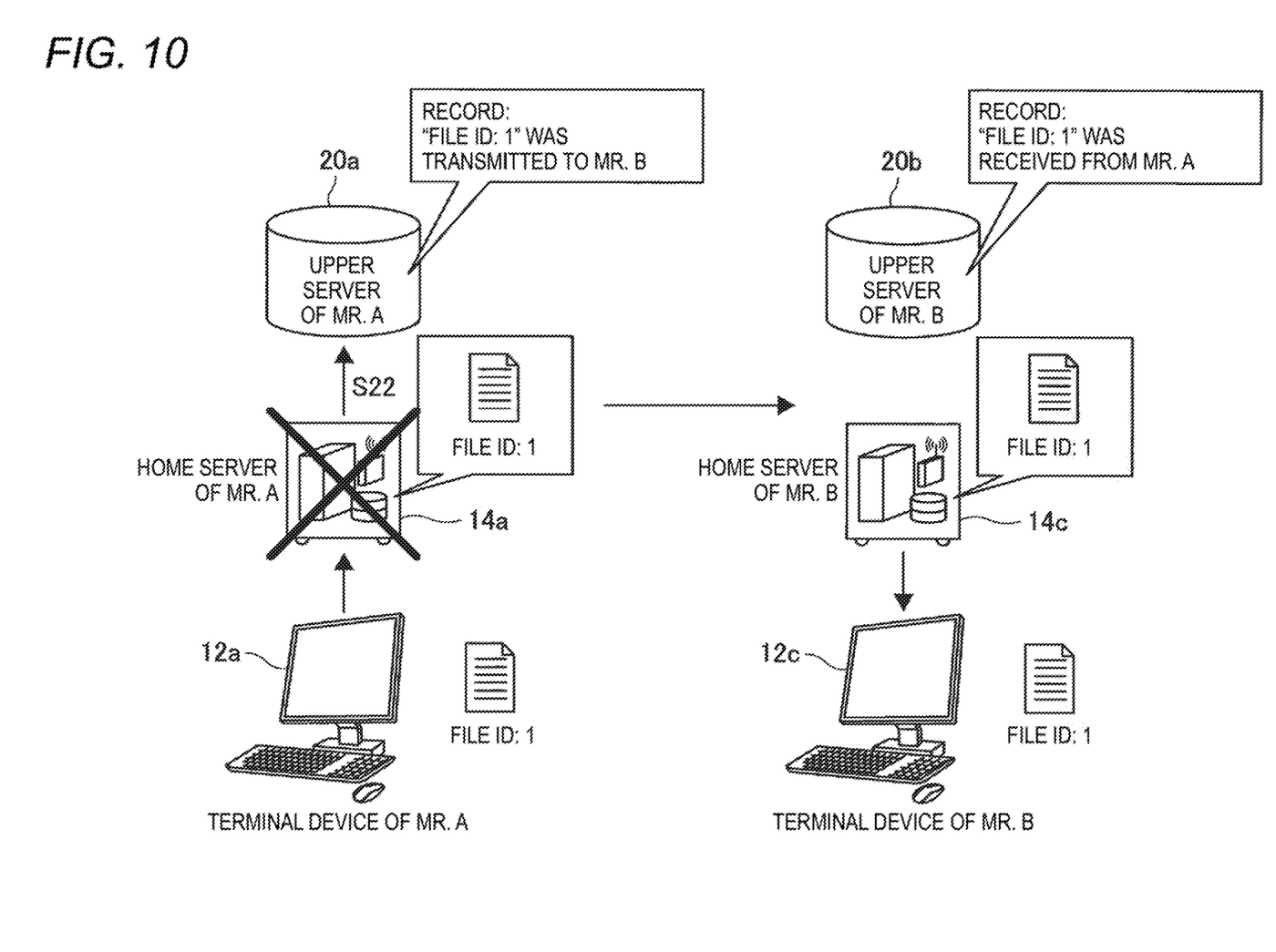
FIG. 10 is a descriptive diagram for describing a flow in Case 3 where the file is restored, in the exemplary embodiment according to the present invention.
Figure 11:
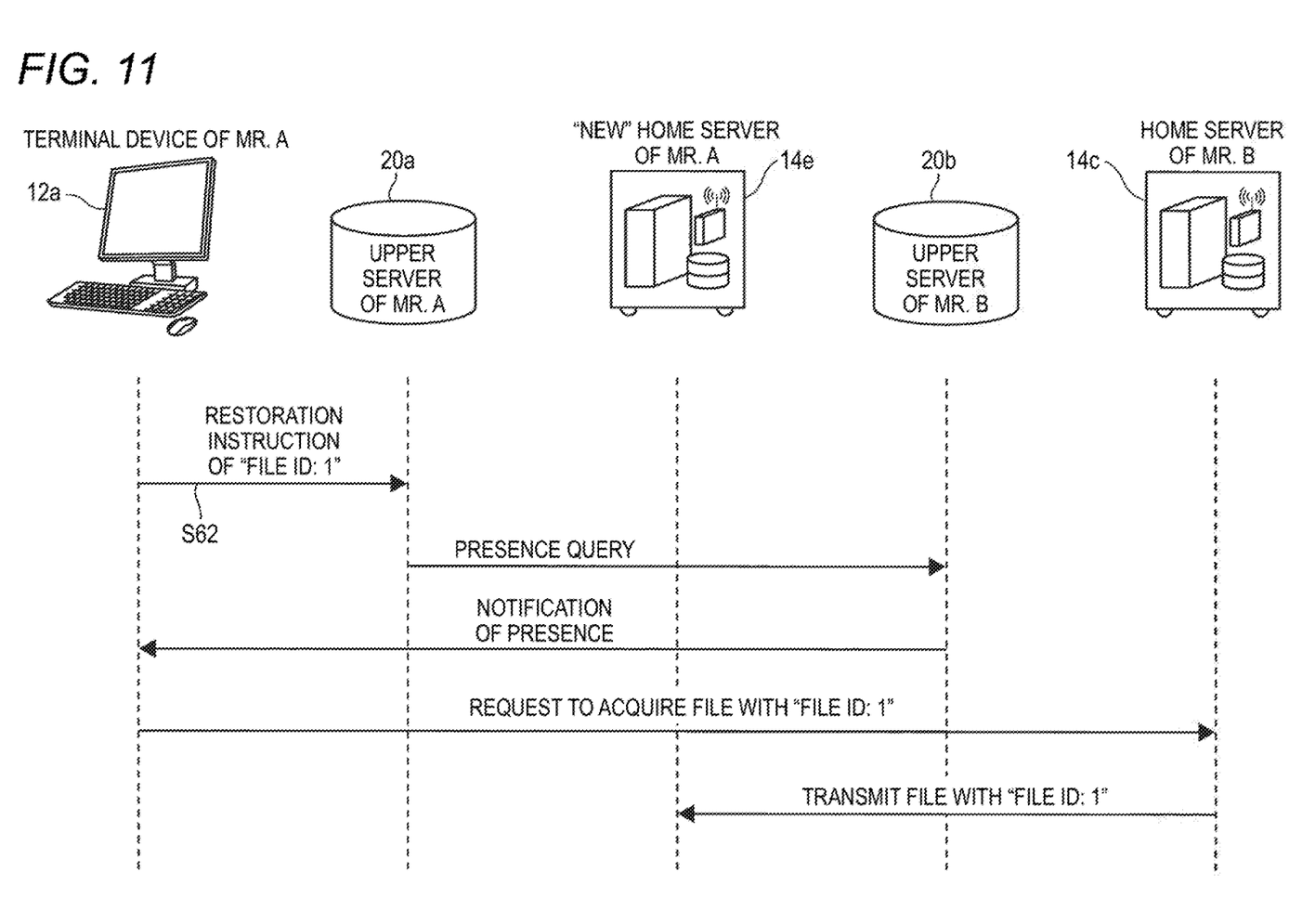
FIG. 11 is a sequence diagram illustrating the flow in Case 3 where the file is restored, in the exemplary embodiment according to the present invention.

In FIGS. 10 and 11, as Case 3, an example of a case where the home server 14a of Mr. A ceases functioning.

In a case where the home server 14a of Mr. A ceases functioning, as illustrated in FIG. 11, it is assumed that the home server 14a that ceases functioning is replaced with a new home server 14e (referred to as the "new" home server 14e).

In this manner, although the home server 14a ceases functioning and thus is replaced with the "new" home server 14e, the record that the file with "file ID: 1" is sent to Mr. B remains in the upper server 20a of Mr. A, and the file with "file ID: 1" continues to be present in the home server 14c of Mr. B. It is noted that, in a case where many files other than the file with "file ID: 1" are stored in the home server 14a of Mr. A, as is the case with "file ID: 1", any other file is dealt with.

At this point, in a case where Mr. A restores a file, in Step S62, the upper server 20a of Mr. A is instructed to restore the file. However, the "new" home server 14e may be instructed to restore the file. In Step S64, the upper server 20a of Mr. A, when is instructed to restore the file, acquires the upper server 20b of Mr. B whether or not the file with "file ID: 1" is present. Because the record that the file with "file ID: 1" is received from Mr. A is present in the upper server 20b, in Step S66, the upper server 20b of Mr. B, when inquired whether or not the file with "file ID: 1" is present, notifies the terminal device 12a of Mr. A that the file with "file ID: 1" is present. The presence of the file with "file ID: 1" is notified to the "new" home server 14e. In Step S68, the terminal device 12a of Mr. A, when notified the presence of the file with "file ID: 1", makes a request to the home server 14c of Mr. B for the acquisition of the file with "file ID: 1". In Step S70, the home server 14c of Mr. B, when receiving the request for the acquisition of the file with "file ID: 1", sends the file with "file ID: 1" to the terminal device 12a of Mr. A, and the terminal device 12a of Mr. A acquires the file with "file ID: 1".

Figure 12:
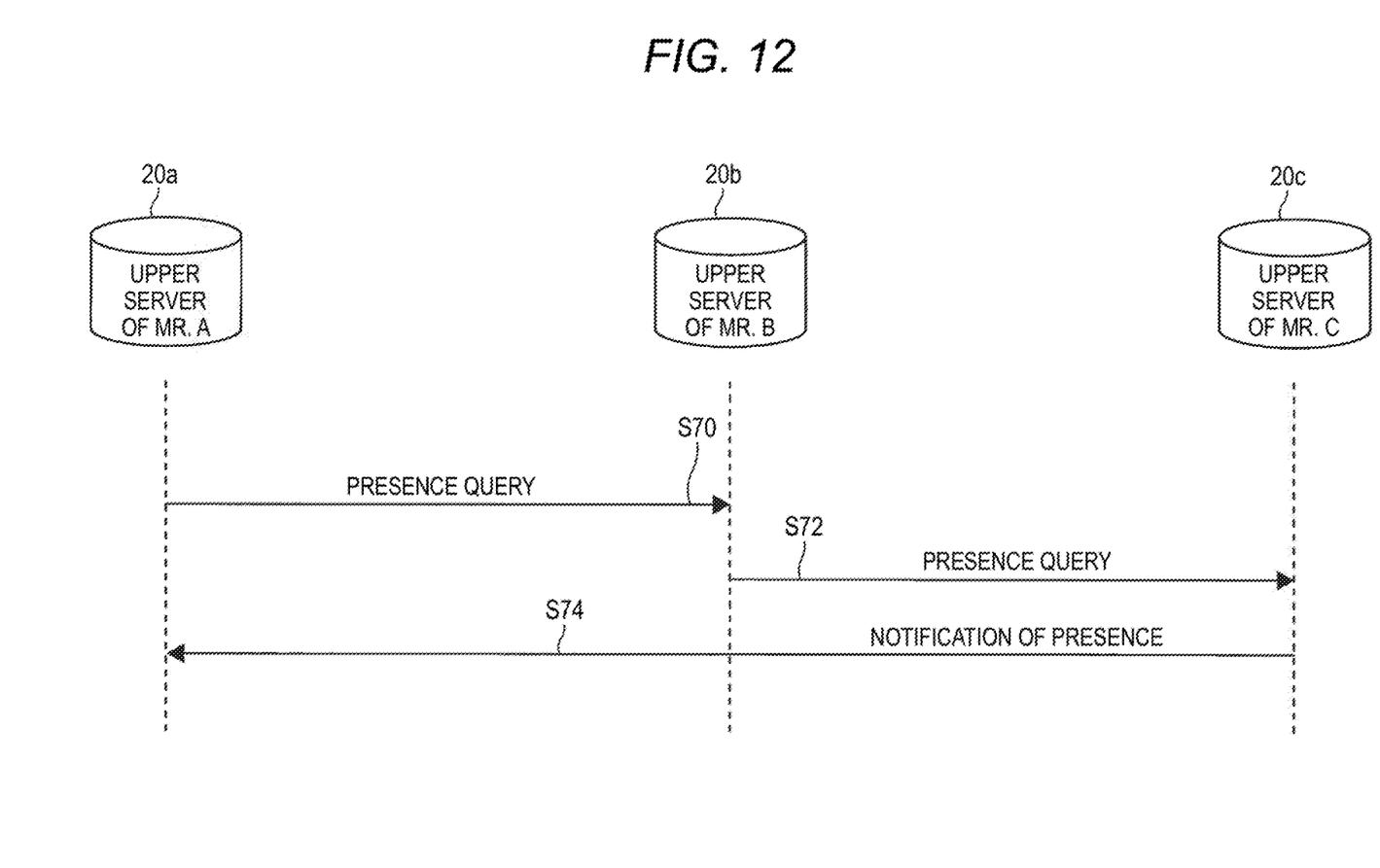
FIG. 12 is a sequence diagram illustrating a flow of information for restoring a file according to another exemplary embodiment according to the present invention.

In FIG. 12, dealing with a case where, although the upper server 20b of Mr. B is inquired of the presence of the file, the file is no longer present in the home server 14c of Mr. B is illustrated.

In Step S70, when the upper server 20a of Mr. A inquires the upper server 20b of Mr. B of the presence of the file, in some case, the record that the file is transmitted from the home server of Mr. A to the home server of Mr. B is present in the upper server 20b of Mr. B, but is already deleted. At this point, in Step S72, when the file is redistributed to Mr. C before the file is deleted, the upper server 20b of Mr. B acquires an upper server 20c of Mr. C of the presence of the file. In Step S74, in a case where the file is present in the home server of Mr. C, the upper server 20c of Mr. C notifies the upper server 20a of Mr. A that the file is present.

It is noted that, in the exemplary embodiment described above, the upper server is configured to be a destination of the query for the presence of the file such that the query is possibly requested in a case where the home server does not work. However, a query may be requested to the home server since the record of the transmission, reception or the deletion is held in the home server. In a case where any one of the upper server and the home server normally works, a destination of the query may be determined according to a load situation of the server or a distance on the network.

Furthermore, the destination of the query may be a terminal device of a creator of a file, or a server to which the creator belongs. As illustrated in FIG. 4, meta information is included in a file ID, and thus a user ID of the creator is able to be acquired. Furthermore, as illustrated in FIG. 1, because a terminal device corresponds to the user ID is registered with the device management servers 14b and 14d, a terminal device is specified from the user ID, and a query is requested to the specified terminal device or home server.

Furthermore, because a person to which a distribution is made for the last time has a high likelihood of retaining a file, a query may be requested to a home server to which a distribution is made for the last time. Because a date and time of transmission of, or reception of, each file is recorded in an upper server, the dates and times are compared with each other, and thus a query is requested to an upper server of the person to which the distribution is made for the last time.

Furthermore, a server to which the creator belongs may be searched before any other home server is requested a query for the presence of a file. In some cases, the file is distributed to another person belonging to the same home server, and thus searching the same home server may take a shorter time to search any other server. For example, a link to another user may be included in a file that is distributed within a home server, and the file in which the link is included in this manner may be searched for.

Figure 13:
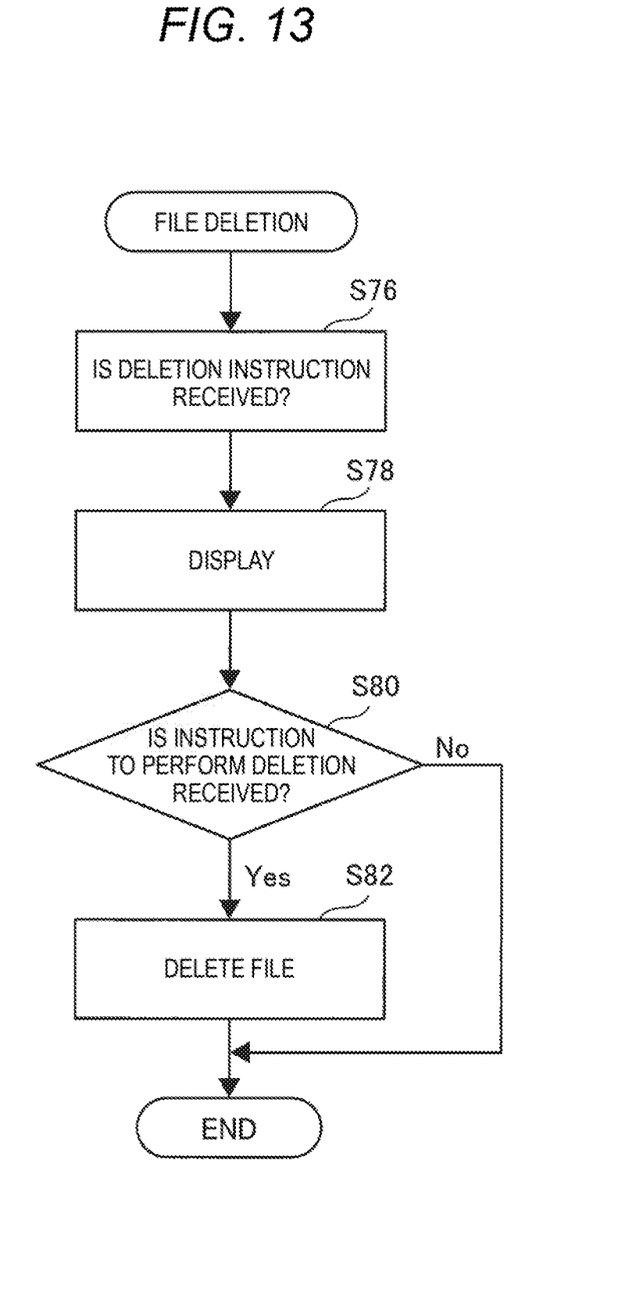
FIG. 13 is a flowchart illustrating a control flow in a case where the file is deleted, in the exemplary embodiment according to the present invention.

In FIG. 13, an operation flow a file deletion is illustrated. First, in Step S76, a deletion instruction is received.

In the next step that is Step S78, a storage situation of a file that is going to be deleted is displayed. Examples of display, for example, are "retained in 10 servers", or, when it is retained in a formal retention place of an organization, "retained within a . . . server" or the likes. Furthermore, in order to avoid inconvenience, only in a case where the number of remaining files is smaller than a prescribed threshold (for example, equal to or smaller than 3), displaying may be performed. A place or the number of remaining files which is retained in a server is able to be obtained from history information on each upper server, but because a home server with a creator of a file works collectively gathers records of transmission and reception or of deletion, a query may be requested to a home server of the creator.

In the next step that is Step S80, it is determined whether or not an instruction to perform deletion is received. In a case where it is determined in Step S80 that the instruction to perform deletion is received, proceeding to Step S82 takes place, a designated file is deleted, and in a case where the instruction to perform deletion is not received, the processing is ended.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management system comprising:
a first file memory, belonging to a first network, that stores a file, the file being uniquely identified; and
a first file management apparatus belonging to the first network, the first file management apparatus including
a first history memory that stores a first history of transmission, reception, and deletion of the file performed in the first network; and
a first processor programed to:
receive, through the first network, a restoration instruction to restore the file from a terminal device belonging to the first network, the restoration instruction being made after a deletion instruction to delete the file is made at the terminal device;
in response to the received restoration instruction, send a request for a query for a presence of the file to a second file management apparatus belonging to a second network including a transmission destination or a transmission source based on the first history stored in the first history memory, the second file management apparatus including a second processor and a second history memory that stores a second history of transmission, reception, and deletion of the file performed in the second network; and
perform control to restore the file by acquiring the file from a second file memory belonging to the transmission destination or the transmission source storing the file in a case where the file is found to be present in the second file memory as a result of the query.

2. The file management system according to claim 1, wherein
in response to a notification that the file is not present in the transmission destination being received, the first processor performs control to acquire the file from another transmission destination to which the transmission destination transmits the file.

3. The file management system according to claim 1, wherein
the first history memory stores information on a creator that creates the file, and
the first processor requests the query for the file to the creator.

4. The file management system according to claim 1, wherein
the first history memory stores a time at which the file is transmitted, and
the first processor requests the query to a latest transmission destination of the file.

* * * * *